United States Patent [19]
Parks et al.

[11] Patent Number: 5,452,463
[45] Date of Patent: Sep. 19, 1995

[54] PROCESSOR AND CACHE CONTROLLER INTERFACE LOCK JUMPER

[75] Inventors: Terry J. Parks, Round Rock; Thomas H. Holman, Jr., Austin, all of Tex.

[73] Assignee: Dell USA, L.P., Austin, Tex.

[21] Appl. No.: 119,799

[22] Filed: Sep. 10, 1993

Related U.S. Application Data

[63] Continuation of Ser. No. 529,985, May 25, 1990, abandoned.

[51] Int. Cl.⁶ .................... G06F 12/00; G06F 12/16
[52] U.S. Cl. .................. 395/726; 364/228.1; 364/238.4; 364/240; 364/243; 364/243.4; 364/243.41; 364/246.8; 364/DIG. 1; 395/427
[58] Field of Search .............. 395/425, 200, 725, 275, 395/650, 325; 340/825.5; 370/85.1; 365/49

[56] References Cited

U.S. PATENT DOCUMENTS

| | | | |
|---|---|---|---|
| 4,740,889 | 4/1988 | Motersole et al. | 364/200 |
| 4,831,581 | 5/1989 | Rubinfeld | 395/250 |
| 4,843,542 | 6/1989 | Dashiell et al. | 364/200 |
| 4,853,846 | 8/1989 | Johnson et al. | 364/200 |
| 4,903,230 | 2/1990 | Kaplan et al. | 395/325 |
| 4,939,641 | 7/1990 | Schwartz et al. | 395/425 |
| 4,959,777 | 9/1990 | Holman | 395/325 |
| 5,060,144 | 10/1991 | Sipple et al. | 395/650 |
| 5,163,143 | 11/1992 | Culley et al. | 395/425 |
| 5,175,829 | 12/1992 | Stumpf et al. | 395/375 |
| 5,182,809 | 1/1993 | Begun et al. | 395/725 |
| 5,185,878 | 2/1993 | Baron et al. | 395/425 |
| 5,210,848 | 5/1993 | Liu | 395/425 |
| 5,226,143 | 7/1993 | Baird et al. | 395/425 |
| 5,237,694 | 8/1993 | Horne et al. | 395/725 |
| 5,276,849 | 1/1994 | Patel | 395/425 |
| 5,301,290 | 4/1994 | Tetzlaff et al. | 395/425 |

*Primary Examiner*—Gopal C. Ray
*Attorney, Agent, or Firm*—Kevin Daffer; James Huffman

[57] ABSTRACT

A computer system including at least one processor and a cache subsystem, in which computer system locked cycles are generated, include a jumper assembly for operatively connecting the at least one processor and the cache subsystem so as to render locked cycles cacheable if the computer system includes only one processor and non-cacheable if the computer system includes more than one processor. A method according to the present invention includes the steps of determining whether there is one or more than one processor in a computer system, and then rendering locked cycles cacheable or non-cacheable accordingly.

13 Claims, 9 Drawing Sheets

PROCESSOR AND CACHE CONTROLLER INTERFACE LOCK JUMPER

This is a continuation of Ser. No. 529,985, filed May 25, 1990 now abandoned.

CROSS REFERENCE TO RELATED APPLICATIONS

This application is related to the following U.S. Patent Applications:

| Serial No. | Title | Inventor | Filing Date |
|---|---|---|---|
| 490,003 | Method and Apparatus Performing Multi-Master Bus Pipelining | Zeller, et al. | 03/07/90 |
| 532,046 | Multiple DRAM Assemblies Using a Single PCB | Holman | 05/25/90 |
| U.S. Pat. No. 5,070,450 | Power-On Coordination System and Method for Multi-Processor | Holman, et al. | Issued: 12/03/91 |
| U.S. Pat. No. 5,261,068 | Dual Path Memory Retrieval System for an Interleaved Dynamic RAM Memory Unit | Gaskins, et al. | Issued: 11/9/93 |
| 516,628 | Digital Computer Having An Error Correction Code (ECC) System With Comparator Integrated Into Re-encoder | Longwell, et al. | 04/30/90 |
| 516,894 | Minimized 32-Bit Error Correction Bad Bit Decoder | Longwell, et al. | 04/30/90 |
| 516,606 | Shared Logic for Error Correction System Encoding | Longwell, et al. | 04/30/90 |

All of the foregoing applications are assigned to the assignee of the present invention and are hereby incorporated by reference.

BACKGROUND OF THE INVENTION

1. Field of the Invention

The present invention relates to computer systems which include a cache memory subsystem and, more particularly, to a method and apparatus for facilitating the handling of locked cycles within such systems.

2. Description of Related Art

Cache memories are often included in computer systems and comprise a small highspeed "scratch-pad" memory which is maintained near an associated processor to speed up the fetch and store time for data used most frequently by the processor. Since data is swapped between the cache memory and the main memory when needed, consistency must be maintained between the data stored in each. A consistency problem appears when main memory is accessed by devices other than the processor. For this reason, when a device other than the processor writes into the main memory at an address corresponding to an address in the cache memory, that address in the cache memory is rendered invalid by the cache controller until the inconsistency is removed.

In multi-processor computer systems there is more than one processor which communicates through a common data bus. While each processor may have its own local, or cache memory, and operate independently of others, they all have access to the main system memory. In such systems, the data stored in main memory must be shared by the several processors. In the case where common data is needed by several processors, there is a possibility that two processors may access and modify the same data packet, resulting in two different versions. A hardware system to prevent this provides a lock signal which a memory arbiter monitors to inhibit any other processor from using that data until the first processor returns the updated version to main memory.

A multitude of prior art electronic data systems include the Intel 80386 microprocessors and 82385 cache controllers. It is useful to examine the interface between such processors and cache controllers in detail in order to more fully understand and appreciate how the data consistency problem, discussed above, has been conventionally handled.

By itself, a microprocessor system bus structure consists of the physical microprocessor address, data and control busses. The local address and data busses are buffered and/or latched to become the "system" address and data busses and the local control bus is decoded by bus control logic to generate the various system bus read and write commands.

A cache memory system monitors each one of the microprocessor memory references to see if the address of the required data resides in the cache. If the data does reside in the cache (a "hit"), it is immediately returned to the microprocessor without incurring the wait states necessary to access main system memory. If the data does not reside in the cache (a "miss"), the memory address reference is forwarded to the main memory controller and the data is retrieved from main memory. Since cache hits are serviced locally, a processor operating out of its local cache memory has a much lower "bus utilization," which reduces system bus bandwidth requirements, and makes more bus bandwidth available to the other bus masters of the system. This is significant because, as is well known to those skilled in the art, the bus in the computer, that is, the communications channel between the CPU and the system memory and storage devices, is a principal bottleneck. Virtually all instructions and all data to be processed must travel this route at least once. Thus, in order to maximize system performance, it is essential that the bus be used efficiently.

As should be fully appreciated by those skilled in the art, the addition of a cache control into a computer system is structured so as to separate the microprocessor bus into two distinct busses: the actual microprocessor bus and the cache controller local bus. The cache controller local bus is designed to look like the front end of a microprocessor by providing a cache controller local bus equivalent to all appropriate microprocessor signals. The system interconnects to this "micro-processor like" front end just as it would to an actual microprocessor. The microprocessor simply sees a fast system bus, and the system sees a microprocessor front end with a low bus bandwidth requirement. The cache subsystem is transparent to both. Transparency, in the data communications field, refers to the capability of a communications medium to pass, within specified limits, a range of signals having one or more defined properties. It should be noted that in such systems the cache controller local bus is not simply a buffered version of the microprocessor bus, but rather, is distinct from, and able to operate in parallel with, the microprocessor bus. Thus, other bus masters, that is, supervisory systems of one kind or another residing on either the cache controller local bus or the system bus, are free to manage the other system resources while the microprocessor operates out of its cache.

As previously mentioned, a computer or other electronic data processing system can comprise multiple microprocessors. One such system is discussed in detail in the related applications further identified in the cross reference to related application section above. There are, of course, many other examples. As is known to those skilled in the art, cache controllers such as the Intel 82385 can be programmed for either master or slave mode operation. When such a cache controller is programmed in slave mode, it drives its local bus only when it has requested and subsequently been granted bus control. This allows multiple microprocessor/cache controller subsystems to reside on the same cache controller local bus.

In multiple processor systems which share a common memory and access bus structure, certain controls are necessary to preserve memory integrity. For example, in bus cycles such as "read-modify-write" it is necessary that a master have exclusive use of the bus for both the read and write cycles to ensure that another master does not access the same data in main memory while that data is being modified. For this reason, such cycles are configured as "locked cycles" in which the master has exclusive use of the bus until its entire cycle has been completed.

Other aspects of microprocessor and cache interfacing relate to cache coherency. Ideally, a cache contains a copy of the most heavily used portions of main memory. To maintain cache "coherency" is to make sure that the data contained in this local copy is identical to the data located at the corresponding addresses in the main memory. In a system where multiple masters can access the same memory there is always a risk that one master will alter the contents of a memory location that is duplicated in the local cache of another master. Such a cache contains "stale" data.

Cache controllers such as the Intel 82385 preserve cache coherency via "bus watching" or "snooping," a technique that neither impacts performance nor restricts memory mapping. A cache controller that is not currently the bus master monitors system bus cycles, and when a write cycle by another master is detected (a snoop), the system address is sampled and used to see if the referenced location is duplicated in the cache. If so (a snoop hit), the corresponding cache entry is invalidated, which forces the associated microprocessor to fetch the up-to-date data from main memory the next time it accesses this modified location.

In operation, a microprocessor/cache controller system executes a number of cycles. These cycles include memory code and data read cycles, memory write cycles, non-cacheable cycles and local bus cycles. When the microprocessor initiates a memory code or data read cycle, the cache controller compares the high order bits of the microprocessor address bus with the appropriate addresses stored in its own chip directory. If the cache controller determines that the requested data is in the cache (a "hit") it issues the appropriate control signals that direct the cache to drive the requested data onto the microprocessor data bus, where it is read by the microprocessor. If the cache controller determines that the requested data is not in the cache (a "miss"), the request is forwarded to the cache controller local bus and the data retrieved from main memory. As the data returns from main memory, it is directed to the microprocessor and also written into the cache. Concurrently, the cache controller updates the cache directory so that the next time this particular piece of information is requested by the processor, the cache controller will find it in the cache and return it with zero wait states.

With regard to memory write cycles, the cache controller's "posted write" capability allows the majority of processor memory write cycles to run with zero wait states. The primary memory update policy implemented in a posted write is the traditional cache "write through" technique, which implies that the main memory is always updated in any memory write cycle. If the referenced location also happens to reside in the cache (a write hit), the cache is updated as well.

Non-cacheable cycles fall into one of two categories: cycles decoded as non-cacheable and cycles that are by default non-cacheable according to the cache controller's design. All non-cacheable cycles are forwarded to the cache controller local bus. Non-cacheable cycles have no effect on the cache or cache directory. It should be appreciated that cache controllers are frequently designed so that certain areas of main memory are non-cacheable. Certain cycles often defined as non-cacheable include I/O cycles, interrupt acknowledge cycles, and halt/shutdown cycles.

Microprocessor local bus cycles are accesses to resources on the microprocessor local bus rather than to the cache controller itself. The cache controller simply ignores these accesses: they are neither forwarded to the system nor do they affect the cache.

To fully understand and appreciate the present invention, it is helpful to be aware of several additional aspects of conventional microprocessor/cache controller systems. First, it should be known that microprocessor outputs include various bus cycle definition signals. In the case of the Intel 80386, these bus cycle definition signals are W/R#, D/C#, M/IO# and LOCK#. These four state outputs define the type of bus cycle being performed. W/R# distinguishes between write and read cycles. D/C# distinguishes between data and control cycles. M/I0# distinguishes between memory and I/O cycles. LOCK# distinguishes between locked and unlocked bus cycles. The primary bus cycle definition signals are W/R#, D/C#, and M/I0#, since these are the signals driven valid as the ADS# (Address Status output) is driven asserted. The LOCK# is driven valid at the same time as the first locked bus cycle begins, which due to the address pipelining, could be later than ADS# is driven asserted. The LOCK # is negated when the READY# input terminates the last bus cycle which was locked.

A second aspect which should be appreciated is the actual microprocessor/cache controller system interface which can be thought of as three distinct interfaces: the microprocessor/cache controller interface; the cache interface; and the cache controller bus interface. Heretofore, the microprocessor/cache controller interface has been considered to be a straightforward connection. With special regard to the cycle definition signals, discussed above, the cache controller is directly connected to those microprocessor outputs. The cycle definition signals are decoded by the cache controller to determine the type of cycle being executed by the microprocessor. If the cycle being executed by the microprocessor is a locked cycle, the cache continually renders the cycle non-cacheable for reasons of cache integrity discussed above.

Prior personal computer systems employing IBM compatible architecture and using the Intel 80386 microprocessor and 82385 cache controller have directly connected the "LOCK#" pins on these two devices. This connection was deemed required because locked cycles need to be non-cacheable in order to maintain the integrity of read-modify-write cycles in multiprocessor systems. However, making all locked cycles non-cacheable requires all locked cycles to access system memory rather than local cache memory. Hence, the performance of locked cycle instructions is poor relative to non-locked cycles. A similar system is shown in U.S. Pat. No. 4,843,542 which discloses disabling communication between a cache and all but one of the processors of a multiprocessor system while a single processor is involved in a read-modify-write process.

The performance penalty exacted from multi-processor systems in order to maintain cache integrity is not required for uniprocessor systems. For single processor systems, locked cycles can be cached because there is no other processor to potentially interfere with the data during the cycle, and system performance can be substantially improved. By making the "LOCK#" connection between the microprocessor and the cache controller jumperable, a system can be configured for maximum performance for uniprocessors while maintaining operational integrity for multiple processors.

Stated another way, the known prior art concerning "LOCK#" in a system using an Intel 80386 microprocessor and 82385 cache controller was to directly connect the "LOCK#" output on the microprocessor to the "LOCK#" input on the cache controller. This connection assured that locked cycle references were not cached and would operate correctly in any environment.

However, in situations where locked cycles could be cached and produce improved system performance, i.e., in systems having only one processor, the prior art configurations did not allow for taking advantage of those aspects.

SUMMARY OF THE INVENTION

The present invention provides a computer system including at least one processor and a cache memory subsystem, which computer system includes means for operatively connecting the at least one processor and the cache memory subsystem, the means for operatively connecting including means for rendering locked cycles cacheable when the computer system includes only one processor. In embodiments of the present invention, the means for operatively connecting also includes means for rendering locked cycles non-cacheable when the computer system includes more than one processor.

In certain embodiments of the present invention the means for rendering locked cycles cacheable if the computer system includes only one processor and for rendering locked cycles non-cacheable if the computer system includes more than one processor includes a selectively connectable jumper.

In embodiments of the present invention, a processor in the computer system may have a cycle definition output pin for producing a signal indicative of locked cycles and the cache subsystem may include a cache controller having a pin for receiving cycle definition signals relating to locked cycles. In such embodiments a selectively connectable jumpered connection according to the teachings of the present invention may be made between those two pins. Such a jumpered connection may include a jumper, jumper plug, and pull up resistor connected between the two pins.

The present invention also provides a method for controlling the cacheability of locked cycles in a computer system including the steps of determining whether there is one or more than one processor in the computer system, making locked cycles cacheable in the computer system if it has only one processor, and making locked cycles non-cacheable in the computer system if it has more than one processor. According to the teachings of the present invention, the latter two steps may be accomplished by not completing or completing, respectively, a selectively connectable jumpered connection.

Accordingly, it is an object of the present invention to easily ensure correct operation with respect to non-cacheability of locked cycles in multiple processor systems, while increasing performance in uniprocessor systems where locked cycles can be cached.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE INVENTION

Figure 1:
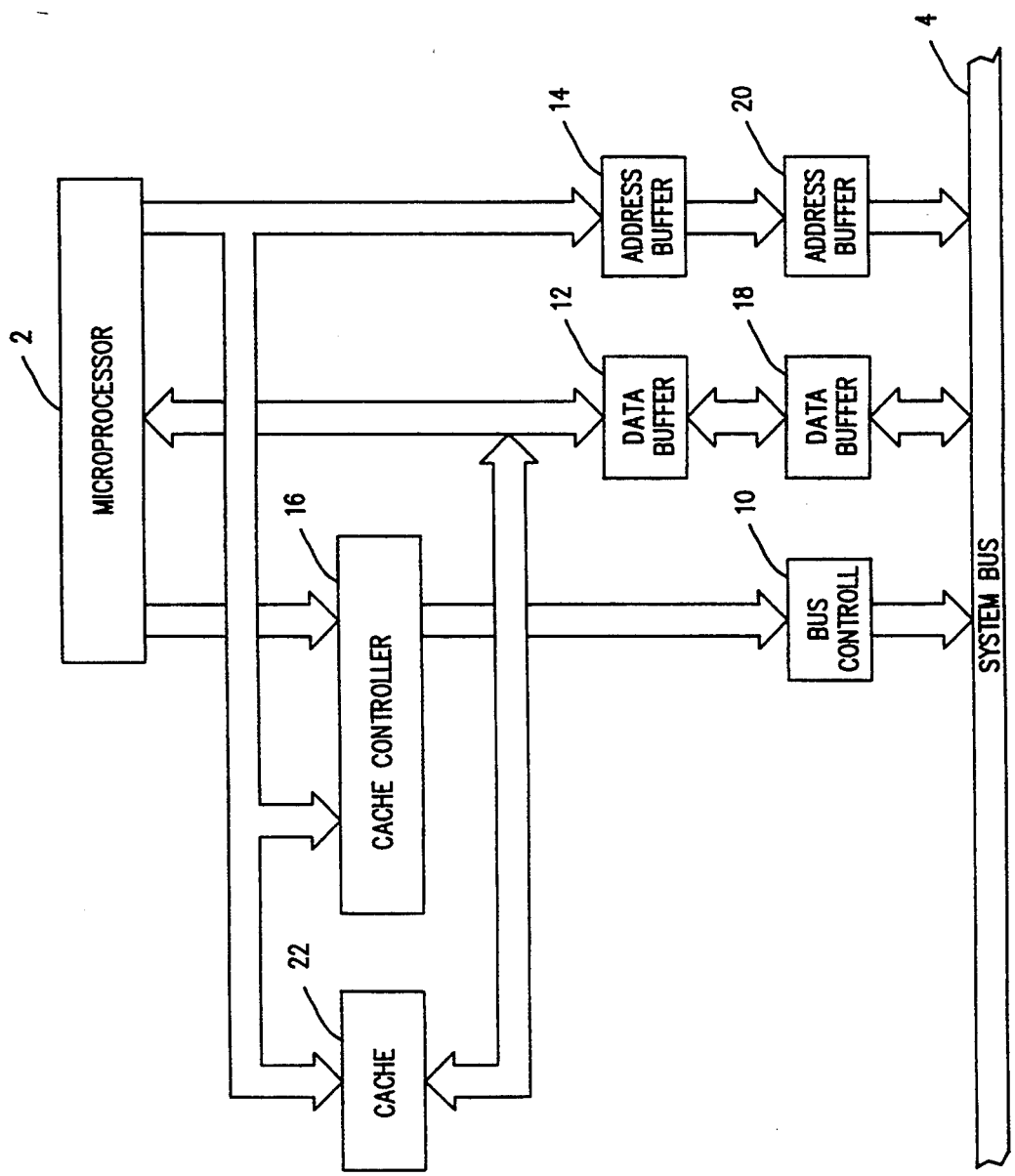
FIG. 1 is a block diagram of a prior art microprocessor and cache controller system bus structure.

Referring now to the drawings, shown in FIGS. 1–4 are diagrams of various prior art structures and configurations that should be understood because they form a substantial part of the general environment of the present invention. While the structure and configurations shown in FIGS. 1–4 were discussed in general in the description of related art section above, further details are set forth below in order to facilitate a better understanding thereby.

As in the electronic computer arts, particularly as applied to personal computers, the term "bus" refers to one or more conductors used for transmitting signals or power from one or more sources to one or more destinations. Bus lines can also be grouped together because of similarity of function, which similarity of function can arise in a connection between two or more systems or subsystems.

Computer systems are frequently considered to comprise a number of subsystems such as CPU, memory and I/O, all of which are interconnected by the system bus. The subsystems generally consist of one or more integrated circuits (IC's) and may be viewed as a collection of registers, or simply, devices capable of retaining information arranged in the form of binary zeros and ones. Registers in general may be considered to be "operational" if they transform data in some way or "storage" if they simply store data. The overall computer system operation, then, can be viewed as one of transferring data, including data that represents instructions, between various registers in the system and transforming data in operational registers.

In view of the foregoing, the system bus of a computer is divided into an address bus, a data bus, and a control bus. The address bus is used by the microprocessor to specify a particular memory location or I/O device that will be involved in a data transfer with the data actually being transferred on the data bus. The signals that control and synchronize the operation of the subsystems by sending and receiving signals along the address and data bases are provided over the control bus.

Referring now specifically to FIG. 1, the bus structure of a typical prior art processor/cache controller system is shown therein. It should be appreciated with reference to FIG. 1 that the addition of a cache controller 16 causes a separation of the microprocessor bus, as defined above, into two distinct buses. The first is the actual microprocessor local bus which extends between a microprocessor 2 and a data buffer 12 and an address buffer 14. The second bus is a "cache controller local bus" which extends between the data buffer 12 and the address buffer 14, on the one hand, and a data buffer 18 and an address buffer 20, respectively, on the other hand. The cache controller local bus is intended to look like the front end of a microprocessor by providing cache controller local bus equivalents to all appropriate microprocessor signals. The computer system, of course, ties or connects to this microprocessor-like front end just as it would to an actual microprocessor. The system sees, for all practical purposes, a microprocessor front end with its low bus bandwidth requirements. The microprocessor, on the other hand, simply sees a fast system bus. The cache subsystem is, as previously indicated, transparent to both.

Continuing to refer to FIG. 1, it should be appreciated that the control and address signals from the microprocessor 2 are both routed through the cache controller 16. Address signals are further routed into a cache 22 associated with cache controller 16 to attempt to locate data that may be stored within. It should be further appreciated that data flow between the cache 22 and the system bus 4, and, hence, other elements, is a two-way interchange. Still further, it should be appreciated that control signals from the microprocessor 2 are routed through a bus control 10, between the microprocessor 2 and the system bus 4.

Figure 2A:
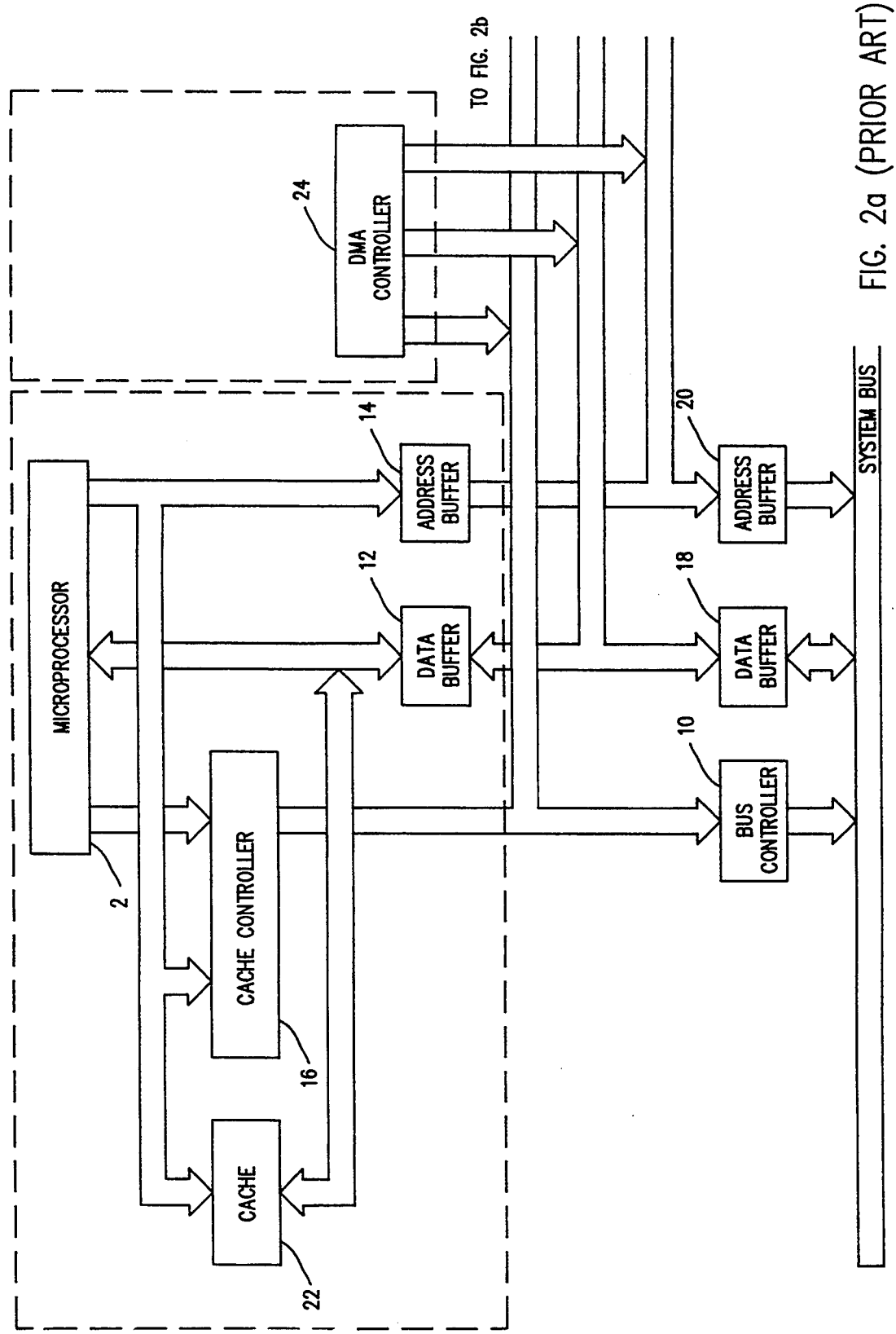
FIGS. 2a and 2b are block diagrams of a prior art multi-master/multi-cache environment.
Figure 2B:
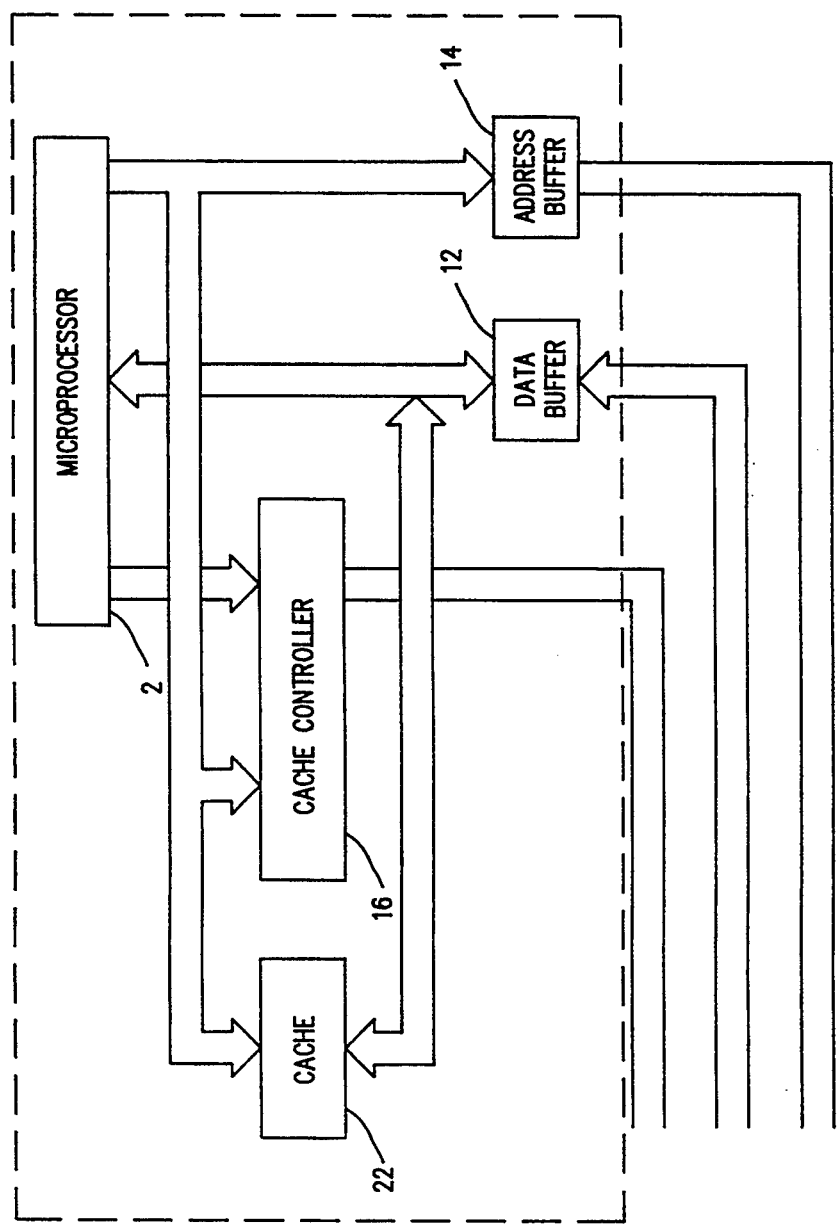
Figure 2B:

Referring now to FIGS. 2a and 2b, a prior art configuration of a multi-master/multi-cache environment is shown therein. As discussed in the description of related art section above, when a cache controller 16 is configured for "slave" mode operation (conventionally accomplished with a hardware strap), it drives the cache controller local bus only when it has requested and has subsequently been granted bus control. This allows multiple processor/cache controller subsystems to reside on the same cache controller local bus as shown in FIG. 2. Control of such configurations typically involves the inclusion and operation of a DMA controller 24, as shown. Constructing the configuration shown in FIG. 2 using Intel components could be readily accomplished using an 82380 DMA controller in connection with 80386 microprocessors and 82385 cache controllers.

Figure 3:
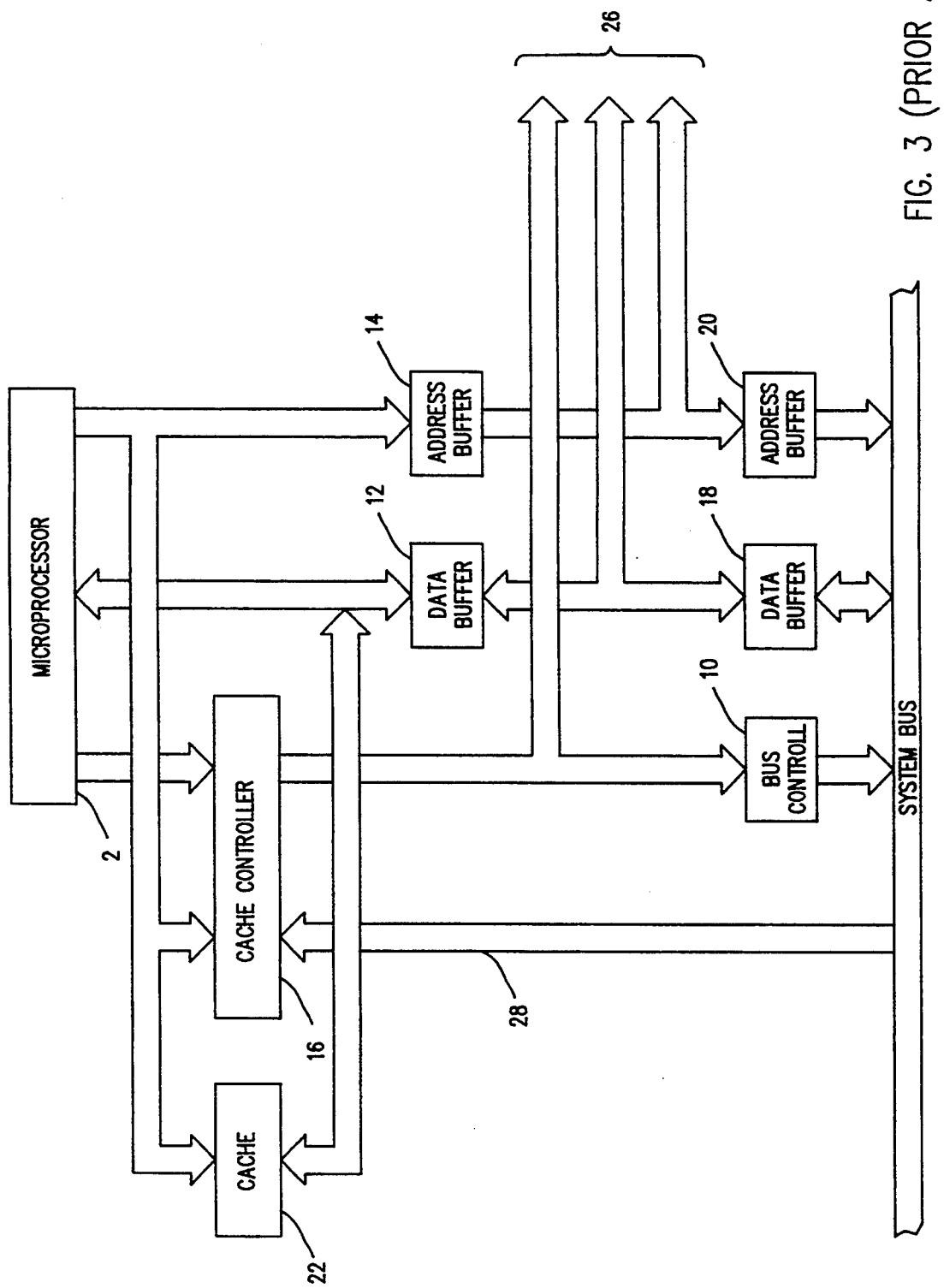
FIG. 3 is a block diagram of a prior art cache controller bus watching configuration for monitoring system bus write cycles.

FIG. 3 depicts a general prior art form of bus watching, which ensures cache coherency. As discussed in the description of related art section above, in a system where multiple masters can access the same memory, there is always a risk that one master will alter the contents of a memory location that is duplicated in the local cache of another master. Cache controllers such as the Intel 32385 preserve cache coherency via "bus watching" or "snooping," a technique that neither impacts performance nor restricts memory mapping. A cache controller that is not currently bus master monitors system bus cycles, and when a write cycle by another master is detected (a "snoop"), the system address is sampled to see if the referenced location is duplicated in the cache. If so (a "snoop hit"), the corresponding cache entry is invalidated, which will force the microprocessor to fetch the up-to-date data from main memory the next time it accesses this modified location. FIG. 3 depicts this type of bus watching used to monitor system bus write cycles. In FIG. 3 bus lines 26 comprise the cache controller local bus and bus 28 is the snoop bus. Snoop bus 28 comprises a system address bus and a write cycle indicator.

Figure 4:
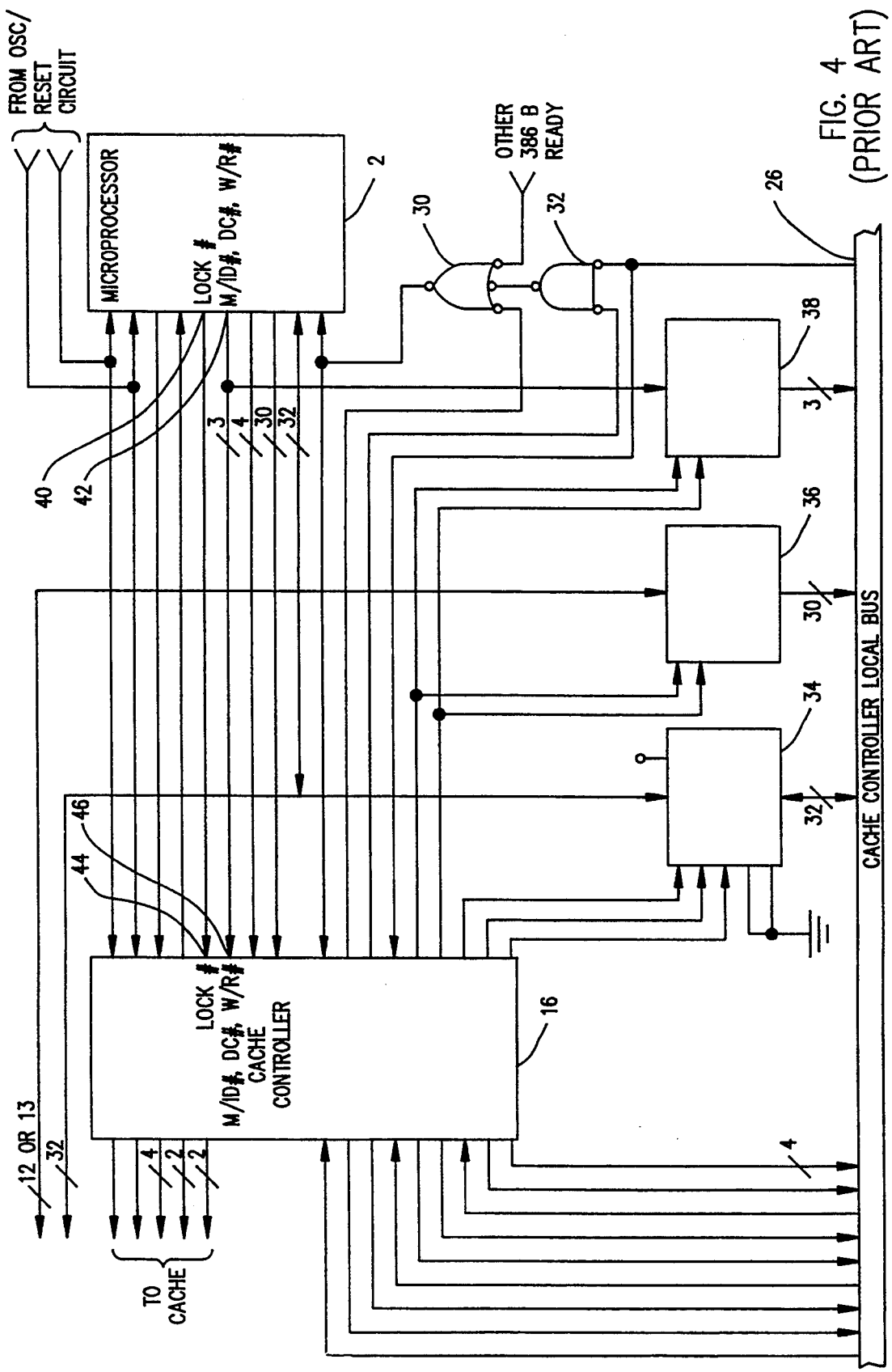
FIG. 4 is a detailed diagram of a prior art microprocessor/cache controller interface.

Referring now to FIG. 4, a diagram of a conventionally interfaced microprocessor 2/cache controller 16 system is shown therein. Because most of the details of this interface are both well known to those skilled in the art and noncritical to understanding the present invention (e.g., precise details regarding gates 30, 32 and transceivers 34, 36, 38 fall into this category), those details are not set forth herein.

FIG. 4 is useful, however, in illustrating that microprocessor 2 has a LOCK# output pin 40 and M/IO#, D/C# and W/R# pin 42 comprising the cycle definition output pins discussed above in connection with the description of related art section. Cache controller 16 has corresponding pins 44, 46 for receiving the LOCK# and other cycle definition outputs, respectively.

As also discussed above in connection with the description of related art section, the prior art expressly teaches the positive connection of pins 40 and 44 at all times. This maintains the integrity of read-modify-write cycles in multiprocessor systems by keeping all locked cycles non-cacheable. However, in a system having only a single processor, locked cycles can be cached without adversely affecting system memory integrity. In such single processor systems, even though locked cycles could be successfully accessed in cache memory, main memory is accessed instead because of the positive LOCK# connection. This causes significantly slower system performance.

According to the teachings of the present invention, a permanent, completed connection is not made between pins such as the LOCK# pins on Intel 80386 microprocessors and 82385 cache controllers. Instead, a selectively connectable jumpered connection is made between those pins. With such a jumpered connection a computer system can easily and readily be allowed to either cache or not-cache locked cycles depending upon whether there is only one, or more than one, microprocessors in the computer system.

Figure 5A:
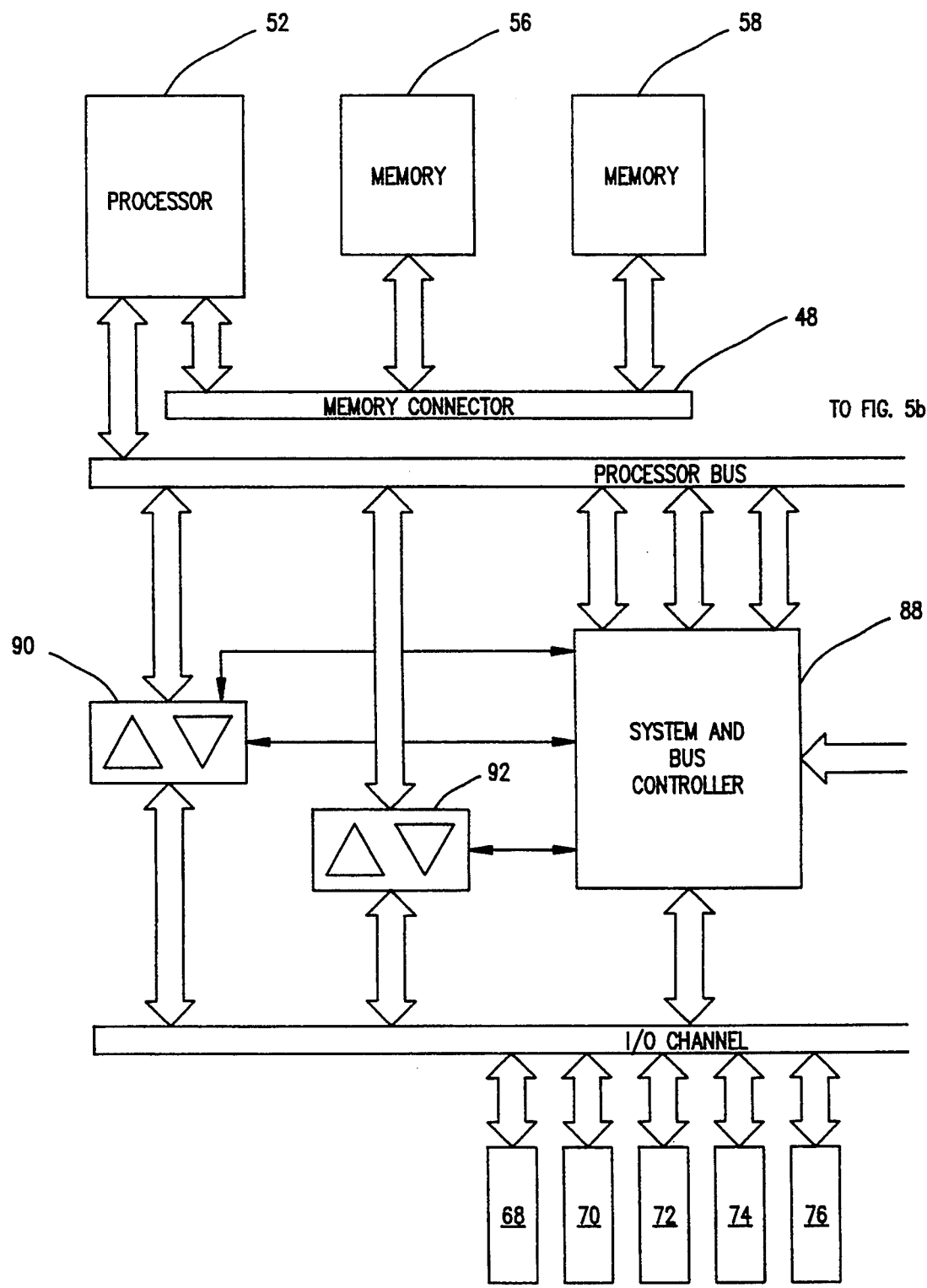
FIGS. 5a and 5b are top level block diagrams of a computer system including a connection according to the teachings of the present invention.
Figure 5B:
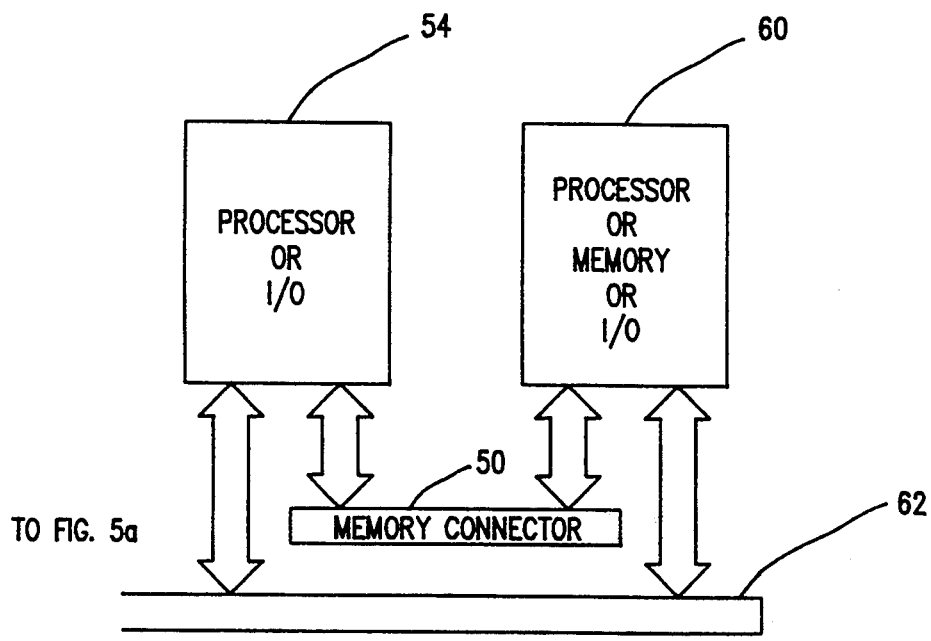
Figure 5B:
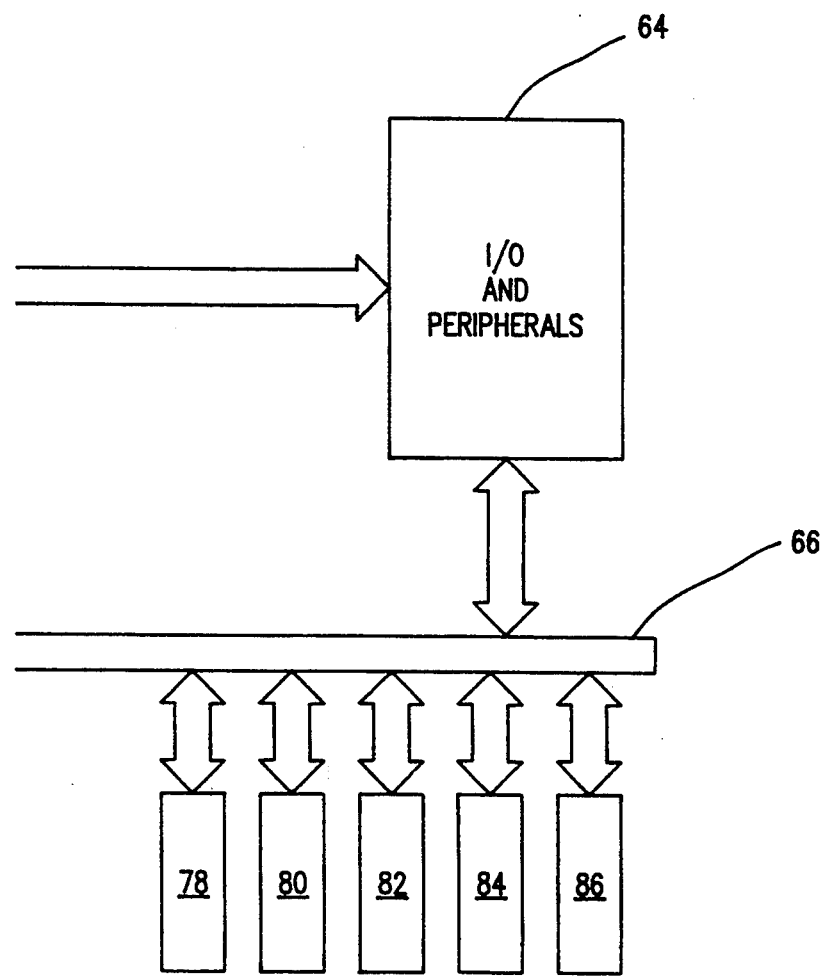

Referring now to FIG. 5, depicted therein is a general high level block diagram of a computer system. The present invention will herein initially be considered at this level, and at a number of successive, more detailed levels, to ensure full understanding and appreciation of the role and operation of the present invention in an environment in which it could be usefully employed.

FIGS. 5a and 5b of a personal computer system employing the connection of the present invention shows four main buses which represent the major interfaces at the top level. These buses are a first memory connector 48 and a second memory connector 50 (which are private interfaces between processors 52, 54 and their dedicated memories 56, 58 and 60, respectively), a processor bus 62 (a multiple master bus which is the architectural break between the processing units, e.g., elements 52, 54, and I/O 64, and perhaps also 60), and an I/O channel 66 (e.g., a standard interface which may be ISA, EISA or microchannel).

The processor bus 62 performs various functions. First, it serves as a connection between the processors 52, and 54, and intelligent I/O, and/or processor 60; all system memory 56, 58 and external memory and the system I/O 64 and I/O expansion slots 68, 70, 72, 74, 76, 78, 80, 82, 84, 86. System memory 56, 58 and 60 may be configured as a virtual 64 bit interleaved memory with two associated banks for storage of one 32 bit double word each, one odd and one even. Thus, the processor bus 62 allows each processor 52, 54 to access another processor's 54, 52 memory. This access is allowed "through" the processor that is directly connected to the memory. That is, when a processor connected to the processor bus 62 requests access to a location in some other processor's memory, the other processor completes the access locally, receiving the address from the processor bus 62 and transferring the data from and to the processor bus 62. Additionally, the processor bus 62 serves as a communication link between processors 52, 54 and 60. Through interprocessor communication mechanisms (the details of which are not critical to the present invention and, for that reason, are not set forth therein), each processor can address and interrupt each other processor.

In addition to the foregoing, the processor bus 62 also acts as the interface between the processor memory complexes and the I/O 64. Through a system and bus controller 88 addresses and data are translated between the processor bus 62 and the I/O channel 66 through a set of transceivers 90, 92 (such as Model 74ALS245 transceivers made by Texas Instruments Incorporated). Through this interface, the processor bus master can access the system I/O and peripherals 64 as well as the I/O expansion slots 68, 70, 72, 74, 76, 78, 80, 82, 84, 86. Still further, the processor bus 62 acts as the data path for I/O to I/O accesses. The system and bus controller 88 generates "action codes" which format the protocol necessary for inter-device communication and enable intelligent cards plugged into an I/O expansion slot to access other I/O cards or even the processor bus memory.

System and bus controller 88, in addition to providing routing information and action code generation, handles all processor bus 62 arbitration and interfaces all control signals to the system I/O 18 (such as ISA "commands", DMA control signals, and interrupts). The system and bus controller 88 is a customized circuit in this preferred embodiment, but is not a part of this invention and will not be described herein.

Figure 6:
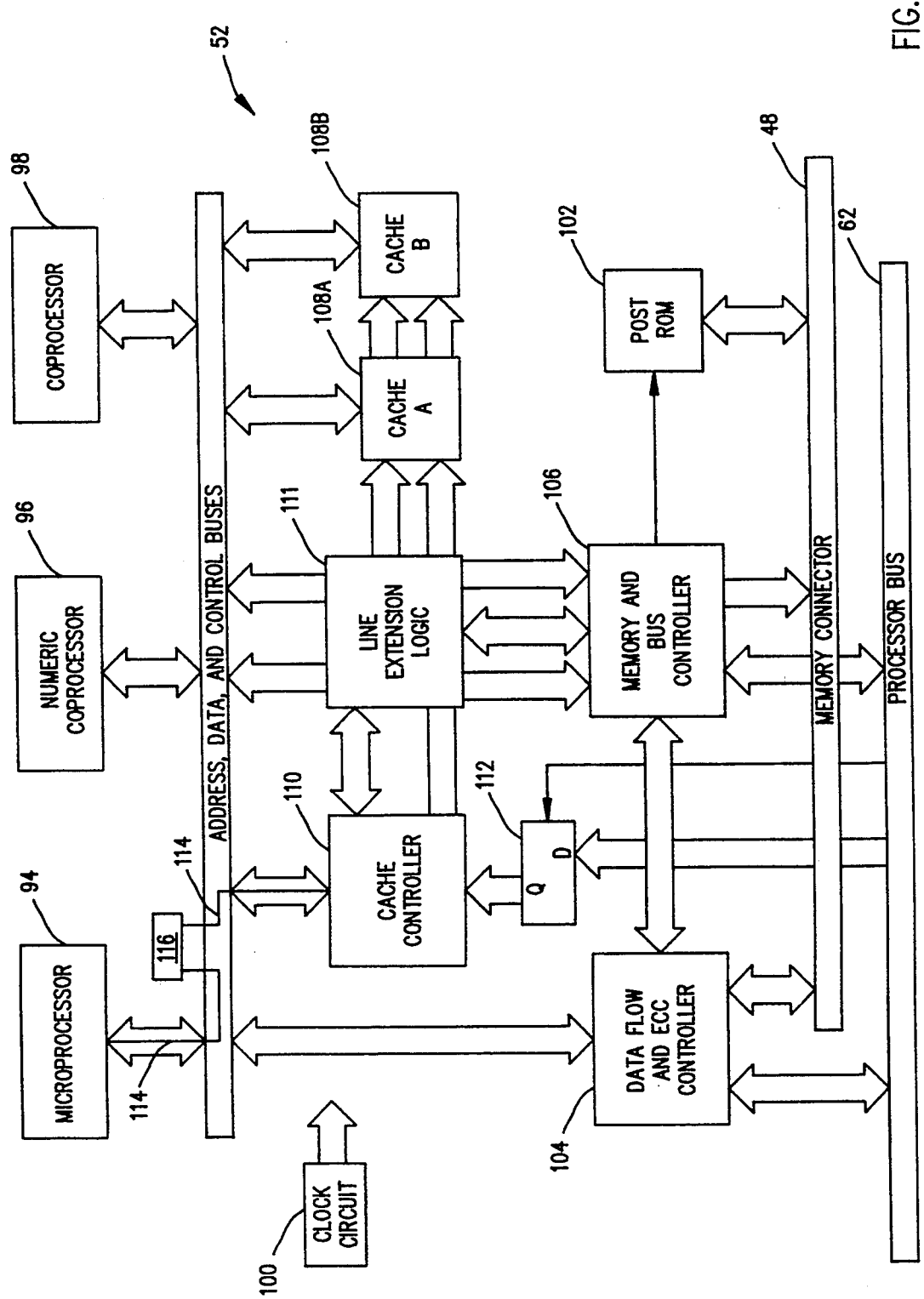
FIG. 6 is a block diagram of a processor module such as could be employed in the computer system of FIG. 5.

Referring now to FIG. 6, there is shown a block diagram of the major components of a processor card. With reference to FIG. 5, this processor module 52 can be seen to interface with the rest of the computer system through memory connector 48 and processor bus 62.

Processor module 52 includes a microprocessor 94 (e.g., an Intel 80386), a numeric coprocessor 96 (e.g., an Intel 80387), an optional coprocessor 98 (e.g., a Weitek 3167), a cache subsystem (discussed below), a clock circuit 100, a POWER ON SELF-TEST READ ONLY MEMORY (POST ROM) 102, a data flow and ECC controller 104, and a memory and bus controller 106. Controllers 104 and 106 are customized circuits but are not a part of this invention and will not be described herein.

The cache subsystem includes a cache memory (shown as consisting of two separate banks 108A, 108B of SRAMs and a cache controller 110 (e.g., an Intel 82385). As should be understood by those skilled in the art, the cache subsystem functions as an extremely fast, "sketchpad-like" memory which provides rapid access to the data most frequently needed by the processor. The system of the present invention relates to the interconnection of microprocessor 94 and cache controller 110. To highlight this fact, and also to highlight the fact that the present invention includes a selectively operable connection element (discussed further below), a line 114 and box 116, signifying, respectively, the interconnection in general and the connection element specifically, are shown in FIG. 6.

For systems with a cache 108A, 108B, a snoop address latch 112 is included to capture each processor address that is generated in order to invalidate addresses if necessary. Additionally, in systems with a cache memory, a programmable array logic (PAL) line extension logic 111 is included to control address and control signals passing between the cache 108A, 108B, cache controller 110, and memory and bus controller 106.

The processor module 52 also includes local address, data and control buses (indicated by the various arrows shown in FIG. 6) that interconnect the microprocessor 94, coprocessors 96, 98 and cache 108A, 108B, as well as the data flow and ECC controller 104 and memory and bus controller 106. These buses are used for local cycles such as POST ROM 102 reads, coprocessor cycles and cache read hits. Access to the POST ROM 102 can be accomplished via operation of the data flow and ECC controller 104. For global cycles such as cache writes, cache read misses, non-cacheable cycles, and I/O cycles, however, the processor module 52 must complete its access off-board.

For off-board cycles, the memory and bus controller 106 decodes the local address and control signals and determines whether the access is destined for the processor bus 62 or for the dedicated memory. For a memory cycle, the memory and bus controller 106 generates the memory control signals (i.e., RAS, CAS and WE) and addresses to access the memory card. The memory and bus controller 106 also generates refresh signals to the memory card, e.g., element 56 of FIG. 5, for each refresh period. In conjunction with the memory bus controller 106, the data flow and ECC controller 104 also performs error checking and correction.

For off-board cycles that are not destined for the memory card 56, the memory and bus controller 106 generates a processor bus request signal and takes control of the processor bus 62 when it is granted. Again, working in conjunction with the data flow and ECC controller 104, the memory and bus controller 106 completes the access to the processor bus 62. As previously discussed, the memory bus controller 106 and data flow and ECC controller are custom-made VLSI components.

Figure 7:
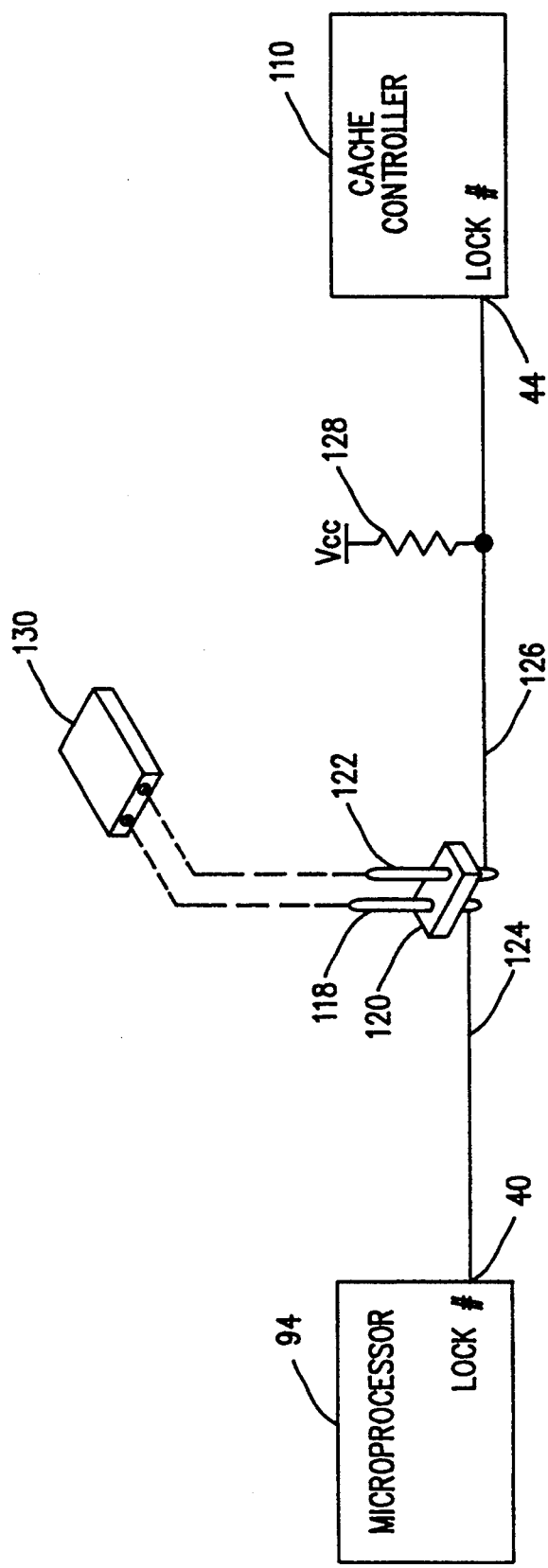
FIG. 7 is a schematic view of a lock jumper system constructed in accordance with the teachings of the present invention.

In FIG. 7 there is shown a preferred embodiment of the present invention. There a selectively connectable jumpered connection is shown between the LOCK# pin 40 on a microprocessor such as microprocessor 2 of FIG. 3 or 94 (i.e., an Intel 80386 microprocessor) and LOCK# pin 44 on the cache controller such as cache controller 16 of FIG. 3 or 110 (i.e., an Intel 82385 cache controller). The selectively completeable circuit connection may be seen to comprise a first jumper pin 118 mounted on an insulator substrate 120 and a second jumper pin 122 also mounted on the insulator substrate 120 and electrically isolated from the first pin 118. The first pin 118 is electrically connected to the LOCK# pin 40 of the microprocessor 94 by a first conductor 124 while the second jumper pin 122 is electrically connected to the LOCK# pin 44 of the cache controller 10 by a second conductor 126. A pull up resistor circuit 128 on the order of 20K ohms is connected to the second conductor 126 to ensure that the LOCK# pin 44 of the cache controller 110 remains high to render bus cycles cacheable. A jumper plug 130 is provided to selectively electrically interconnect the first jumper pin 118 and the second jumper pin 122 and thereby electrically interconnect the LOCK# pin 40 of the microprocessor 94 and the LOCK# pin 44 of the cache controller 110. Without the jumper plug 130 in place the LOCK# pin 44 of the cache controller 110 remains high and all bus cycles are rendered cacheable to increase the speed of the system. With the jumper plug 130 in place, a low on the LOCK# pin 40 of the microprocessor 94, indicating the bus cycle should be a locked cycle, drives the LOCK# pin 44 of the cache controller 110 low to render the cycle non-cacheable and prevents interference with system memory integrity.

Systems employing the system of the present invention may be manufactured so as to have all portions of the present invention except for the jumper plug 130. The jumper plug 130 is installed only in those systems that are originally manufactured with, or later come to have, more than one microprocessor. Thus, the benefit of ensuring non-cacheability of locked cycles in multiple processor systems can be obtained, but speed in uniprocessor systems can still be obtained by not connecting pins 120 and 122, thereby not preventing caching of locked cycles, such as read-modify-write bus cycles.

Numerous modifications and variations are possible in view of the above teachings. For example, a simple switching mechanism or some other sort of electrical circuit completing/breaking means could be employed instead of a jumper and jumper plug. Other modifications and variations are possible. Accordingly, within the scope of the appended claims, the invention may be practiced otherwise than as specifically described herein.

What is claimed is:

1. A computer system including at least one processor and a cache subsystem electrically connected to said at least one processor via a bus, in which said at least one processor generates read-modify-write cycles (locked), and in which said read-modify-write cycles are designated by a lock signal generated by said at least one processor, said computer system comprising:

means for determining whether there is one or more than one processor in said computer system; and a selectively connectable jumper for enabling transmission of said lock signal generated by said at least one processor to said cache subsystem, said selectively connectable jumper for rendering said locked cycles cacheable if said computer system comprises only one processor and for rendering said locked cycles non-cacheable if said computer system comprises more than one processor.

2. A computer system as set forth in claim 1, wherein said at least one processor has a cycle definition output pin for providing a signal indicative of whether a cycle is locked.

3. A computer system as set forth in claim 2, wherein said cache subsystem comprises a cache controller having a pin for receiving cycle definition signals relating to locked cycles from said cycle definition output pin.

4. A computer system as set forth in claim 3, wherein said selectively connectable jumpered connection is made between said cycle definition pin of said processor and said pin for receiving cycle definition signals relating to locked cycles of said cache controller.

5. A computer system as set forth in claim 4, wherein said selectively connectable jumpered connection comprises a pair of jumper pins selectively connectable in circuit between said cycle definition pin of said processor and said pin for receiving cycle definition signals relating to locked cycles.

6. A computer system as set forth in claim 5, wherein said jumper pins are selectively connectable by an associated jumper plug.

7. A computer system as set forth in claim 6, wherein a pull up resistor circuit is connected to a point in circuit between one of said jumper pins and said pin for receiving cycle definition signals relating to locked cycles of said cache controller.

8. A computer system as set forth in claim 7 where said pull up resistor circuit includes a 20K ohm resistor.

9. A computer system having a system memory and adapted to allow multiple processors to communicate with said system memory along a common bus structure and including connection means for connecting multiple processors to said system memory via said common bus structure and in which each of said multiple processors comprises:

a microprocessor including an output terminal onto which is produced a signal indicative of a locked cycle to prevent any other processor from accessing the system bus during that cycle;

a cache memory system associated with said microprocessor and including a cache controller having an input terminal for receiving a signal indicative of a microprocessor memory cycle which is to be non-cacheable; and a jumper assembly including first and second terminals electrically insulated from one another and electrically connected, respectively, to said microprocessor output terminal and said cache controller input terminal, wherein said first and second terminals remain electrically isolated if said computer system comprises only one processor to enable locked cycles thereof to be cacheable and thereby increase the speed of the system, and wherein said first and second terminals remain electrically connected if said computer system comprises multiple processors to ensure that all locked cycle are non-cacheable to preserve memory integrity.

10. A computer system as set forth in claim 9, wherein said jumper assembly further includes a pull up resistor circuit electrically connected to said second terminal to allow access to said cache memory by said microprocessor.

11. A computer system as set forth in claim 10, wherein said first and second terminals comprise first and second jumper pins, respectively, and wherein said jumper assembly further comprises a jumper plug for selectively connecting said first and second jumper pins to permit a signal indicative of a locked cycle produced on the output terminal of said microprocessor to be electrically coupled to the input terminal of said cache controller and render such locked cycle non-cacheable by inhibiting access of the microprocessor to the cache memory.

12. A computer system as set forth in claim 11, further comprising a processor card on which said microprocessor, said cache memory system, and said jumper assembly are all mounted.

13. A method for controlling cacheability of read-write-modify (locked) cycles in a cache subsystem of a computer system comprising the steps of:

determining whether there is one or more than one processor in said computer system;

making read-write-modify (locked) cycles cacheable in said computer system if said computer system has only one processor; and making read-write-modify (locked) cycles non-cacheable in said computer system if said computer system has more than one processor;

wherein at least one processor in said computer system has a cycle definition output pin for providing a signal which is indicative of whether a cycle is locked, wherein said computer system further includes a cache controller having a pin for receiving said indicative signal from said cycle definition output pin and wherein a jumpered connection is made between said two pins, wherein said step of making locked cycles cacheable in said computer system having only one processor comprises the step of breaking the jumpered connection, and wherein said step of making locked cycles non-cacheable in said computer system having more than one processor comprises the step of completing the jumpered connection.

* * * * *